United States Patent [19]

Hayasaki

[11] Patent Number: 5,440,223
[45] Date of Patent: Aug. 8, 1995

[54] SWITCHING POWER CIRCUIT WITH REDUNDANT STRUCTURE

[75] Inventor: Kiyonobu Hayasaki, Tokyo, Japan

[73] Assignee: NEC Corporation, Tokyo, Japan

[21] Appl. No.: 298,432

[22] Filed: Aug. 30, 1994

[30] Foreign Application Priority Data

Aug. 30, 1993 [JP] Japan .................. 5-235911

[51] Int. Cl.$^6$ .......................... H02M 3/335
[52] U.S. Cl. .................... 323/282; 323/272
[58] Field of Search .......... 323/288, 271-272, 323/282-285, 267, 353-354, 351; 363/21, 26, 97, 56, 71-72

[56] References Cited

U.S. PATENT DOCUMENTS

| | | | |
|---|---|---|---|
| 4,679,130 | 7/1987 | Moscovici | 363/17 |
| 4,772,995 | 9/1988 | Gautherin et al. | 363/21 |
| 5,122,726 | 6/1992 | Elliott et al. | 323/272 |

FOREIGN PATENT DOCUMENTS 1-107656 4/1989 Japan .

Primary Examiner—Steven L. Stephan
Assistant Examiner—Aditya Krishnan
Attorney, Agent, or Firm—Foley & Lardner

[57] ABSTRACT

A switching power circuit with a redundant structure comprises a back-current obstructing element provided at an output side of the switching power circuit, error amplifiers provided at an output side (the load side) and internal side (the switching power circuit side) of the back-current obstructing element, respectively, to control both the voltages at the output side and inside of the back-current obstructing element, a field effect transistor used as the back-current obstructing element so that a source electrode and a drain electrode are connected in a forward direction with respect to an output current, and a voltage detecting circuit for detecting an output voltage of the error amplifier for inside of the switching circuit to produce an output signal on the basis of which a gate voltage of the field effect transistor is controlled.

2 Claims, 3 Drawing Sheets

SWITCHING POWER CIRCUIT WITH REDUNDANT STRUCTURE

BACKGROUND OF THE INVENTION

1. Field of the Invention

This invention relates to a switching power circuit, more particularly to a switching power circuit with a redundant structure used in a telecommunication device.

2. Description of the Related Art

In a conventional switching power circuit with a redundant structure, diodes such as a Schottky barrier diode (SBD) or the like have been generally used as a back-current obstructing element, however, since the diodes fundamentally cause a constant voltage drop, power loss is large and power conversion efficiency is low. Also, it is proposed that a field effect transistor (FET) be used for the back-current obstructing element as means for improving the above.

As one example, a switching power circuit disclosed in for example, Japanese Patent Unexamined Publication No. Hei 1-107656 will be described with reference to FIG. 1.

As shown in FIG. 1, the conventional switching power circuit includes a primary winding 22a of a voltage conversion transformer 22 and a switching transistor 23 both of which are connected in series with an input power source 21a, rectifying diodes 24 and 25 connected to a secondary winding 22b of the voltage conversion transformer 22, a smoothing filter consisting of a choke coil 29 and a capacitor 30, an FET 31 connected to a usual forward converter consisting of a voltage control circuit 32 and a load 33, and a rectifying circuit consisting of a capacitor 27 and a bias resistor 28.

The FET 31 is interposed between the load 33 and the smoothing filter consisting of the choke coil 29 and the capacitor 30 in such a manner that a source electrode of the FET 31 is connected to an output terminal of the smoothing filter, a drain electrode thereof is connected to the load 33 and a gate electrode thereof is connected to a diode 26 connected to the secondary winding 22b of the voltage conversion transformer 22 and the rectifying circuit consisting of the capacitor 27 and the bias resistor 28. Reference numeral 34 denotes a switching power circuit with a redundant structure of another system, which is a switching power circuit with the same structure of that having structural elements of the input power source 21a to the voltage control circuit 32.

The operation of the conventional switching power circuit thus organized will be described.

First, in a state where the switching power circuit is operated normally, the output voltage of the diode 26 is set to be twice or three times as large as the output voltage of the switching power circuit according to the duty condition peculiar to the switching power circuit, and a voltage between the gate and the source of the FET 31 is equal to or twice as large as the output voltage of the switching power circuit so that the FET 31 is satisfactorily turned on. Then, the voltage drop of the FET 31 is expressed by the following expression (1), and the voltage drop can be remarkably reduced by selecting an FET having a low on-state resistance $R_{ON}$ as the FET 31, in comparison with the use of usual diodes, thereby being capable of reducing power loss.

$$V_{DS} = R_{ON} \times I_{OUT} \tag{1}$$

where $V_{DS}$ is a voltage between the source and the drain and $I_{OUT}$ is an output current.

When the switching power circuit is not operated because of some trouble, switching off or the like, the induced voltage of the voltage conversion transformer 22 becomes zero (0), as a result of which the gate potential of the FET 31 is clamped to zero due to the bias resistor 28, thereby turning off the FET 31. The conventional switching power circuit has the disadvantages that the gate driving speed of the FET is low and the output current flows into the switching power circuit at the time when the rectifying diode or the like is short-circuited, thereby enlarging the fluctuation of the output voltage.

SUMMARY OF THE INVENTION

In order to solve the above-mentioned problems, an object of the invention is to provide a switching power circuit with a redundant structure which realizes the low power loss circuit with the redundant structure for a telecommunication device and a high-speed response with respect to the troubles of internal components.

The above object of the invention has been achieved by the provision of a switching power circuit with a redundant structure which includes a back-current obstructing element provided at an output side of the switching power circuit, two error amplifiers each of which is connected to an electrode of the back-current obstructing element for the output side of the switching power circuit and an electrode of the back-current obstructing element for the inside of the switching power circuit respectively are provided so as to control voltages at both the output side (the load side) and the internal side (the switching power circuit side) of the back-current obstructing element, characterized in that a field effect transistor is used as the back-current obstructing element so that a source electrode and a drain electrode are connected in a forward direction with respect to the output current, and a gate voltage of the field effect transistor is controlled in accordance with an output signal of a voltage detecting circuit for detecting an output voltage of the error amplifier connected to the electrode of the back-current obstructing element for the inside of the switching power circuit.

In the switching power circuit with the redundant structure in accordance with the invention, the output voltage of the error amplifier connected to the electrode of the back-current obstructing element for the inside of the switching power circuit is detected so as to control the gate of the back-current obstructing FET.

BRIEF DESCRIPTION OF THE DRAWINGS

The present invention will be described in more detail with reference to the accompanying drawings, in which.

DETAILED DESCRIPTION OF THE PREFERRED EMBODIMENT

The present invention will be described with reference to the accompanying drawings.

Figure 1:
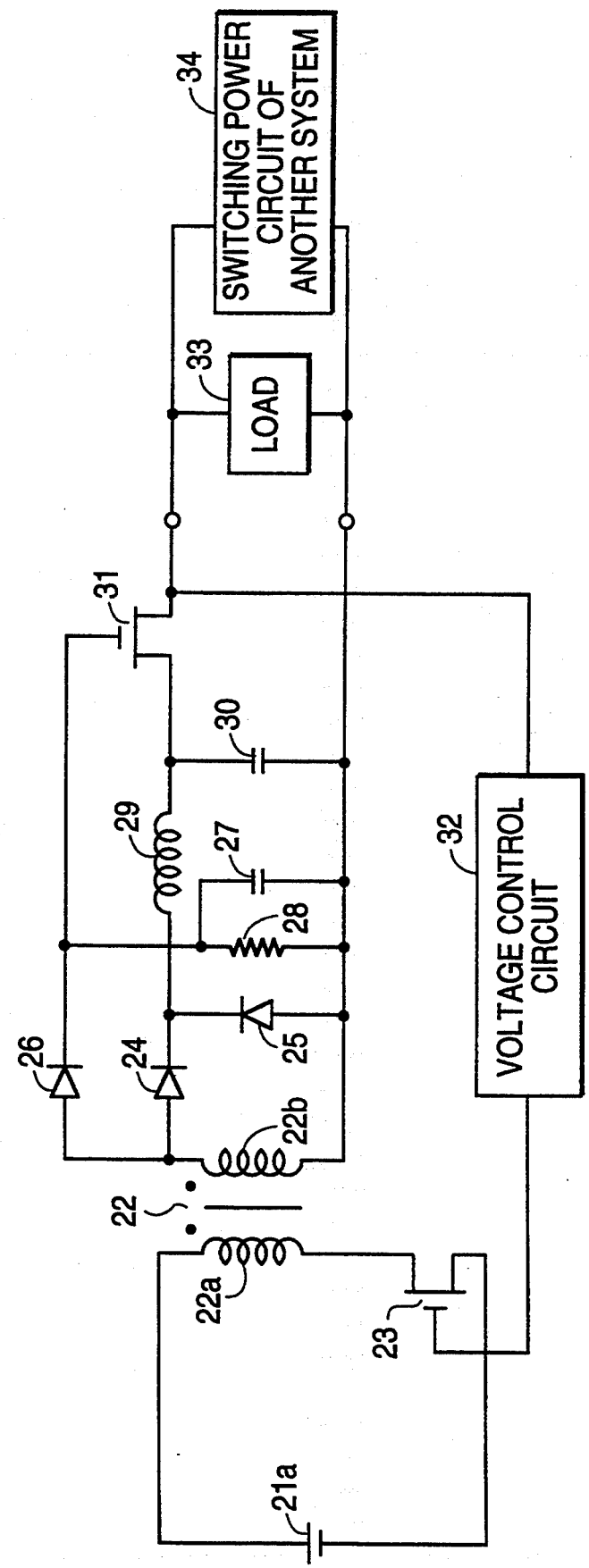
FIG. 1 is a circuit diagram showing one example of a conventional switching power circuit.
Figure 2:
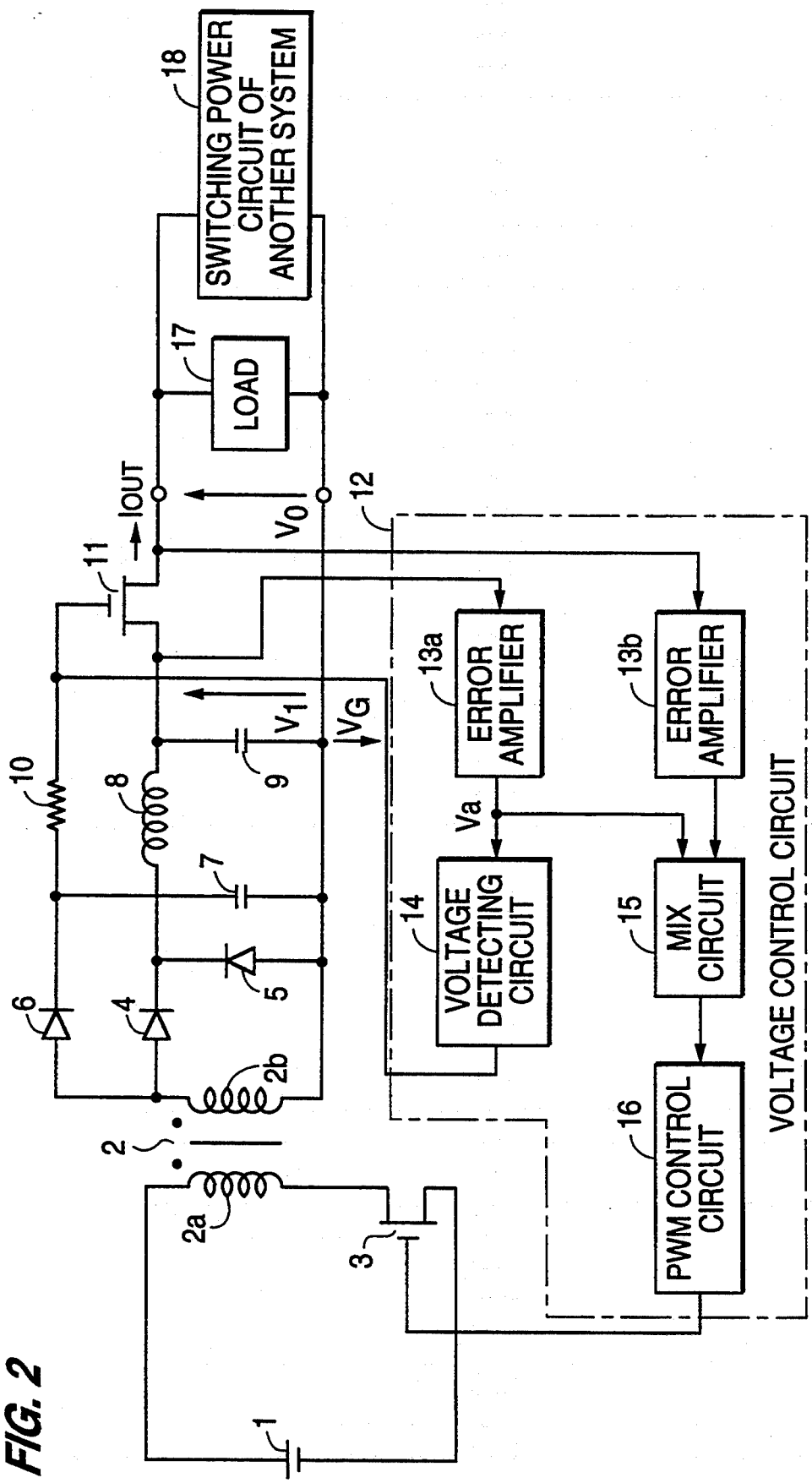
FIG. 2 is a circuit diagram showing a switching power circuit with a redundant structure in accordance with one embodiment of the present invention.

FIG. 2 is circuit diagram showing a switching power circuit with a redundant structure in accordance with one embodiment of the present invention.

In FIG. 2, reference numeral 1 denotes an input power source to which a primary winding 2a of a voltage conversion transformer 2 and a switching transistor 3 are connected in series. Rectifying diodes 4 and 5 are connected to a secondary winding 2b of the voltage conversion transformer 2, and a smoothing filter consisting of a choke coil 8 and a capacitor 9 is connected to a junction of the cathodes of the rectifying diodes 4 and 5.

A back-current obstructing FET 11, a gate driving power diode 6 for the gate of the FET 11, a filter capacitor 7 and a gate bias resistor 10 are added to a usual switching power circuit consisting of a voltage control circuit 12, and two error amplifiers are provided as an internal voltage control error amplifier 13a which is connected to the electrode of the back-current obstructing FET 11 for the inside of the switching power circuit and an output voltage control error amplifier 13b which is connected to the electrode of the back-current obstructing FET 11 for the output side of the switching power circuit. A pulse width modulation (PWM) control circuit 16 for controlling the operation of the switching transister 3 is driven through a mixture (MIX) circuit 15 which mixes both of the output signals of the internal voltage control and output voltage control error amplifiers 13a and 13b. The output signal of the internal voltage control error amplifier 13a is applied to a voltage detecting circuit 14 so as to drive the gate voltage of the FET 11. Reference numeral 17 denotes a load and 18 denotes a redundant switching power circuit of another system.

As described above, the switching power circuit with a redundant structure in accordance with this embodiment is so constituted as to provide a back-current obstructing element at an output side of the switching power circuit and dispose the respective error amplifiers 13a and 13b at the output side and the internal side of the back-current obstructing element to control the voltages on both the output side and the internal side of the back-current obstructing element. The FET 11 is used as the back-current obstructing element so that a source electrode and a drain electrode are connected in a forward direction with respect to an output current (i.e., if the FET is an "n" channel type FET, then a drain electrode is connected to the load 33 side, but if the FET is a "p" channel type FET, a source electrode is connected to the load 33 side), and the gate voltage of the FET 11 is controlled in accordance with the output signal of the voltage detecting circuit 14 which detects the output voltage of the internal error amplifier 13a.

Figure 3:
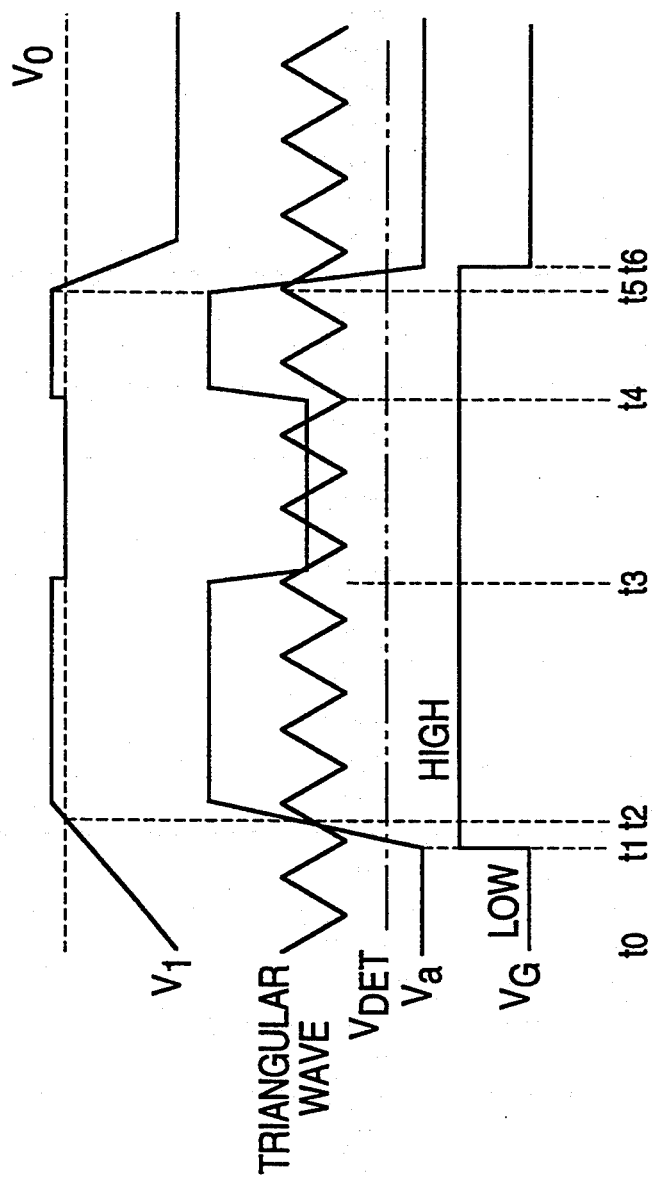
FIG. 3 is a timing chart for explanation of the operation of the switching power circuit shown in FIG. 2.

The operation of the embodiment shown in FIG. 2 will be described with reference to FIG. 3 (a timing chart) representing the operational principle of the invention.

First, in a process where an output voltage $V_1$ rises after a power source is turned on at a time of $t_0$, an output voltage Va of the error amplifier 13a requires a maximum pulse width and is clamped to a minimum voltage whose level is lower in comparison with a triangular wave which gives a pulse width reference because the output voltage $V_1$ does not reach a set value $V_0$. Then, because the detection voltage $V_{DET}$ of the voltage detecting circuit 14 is set to the set value as indicated by a two-dot chain line in FIG. 3, an output voltage $V_G$ of the voltage detecting circuit 14 remains low, the back-current obstructing FET 11 is cut off, and the switching power circuit itself is cut off from the load side.

Subsequently, when the output voltage $V_1$ reaches the set value $V_0$ at a time of $t_1$, the output voltage Va of the error amplifier 13a starts to rise so as to cross the voltage amplitude level of the triangular wave. At this time, if the set voltages of the error amplifiers 13a and 13b are identical with each other (set value $V_0$), the output voltage $V_1$ exceeds the set value $V_0$ by the aid of the mixture (MIX) circuit 15 so that it is clamped to a voltage of Vf=on-state resistance of FET×Iout, where Iout represents an output current. At this time, because the output voltage $V_1$ is higher than the set value $V_0$ of the error amplifier 13a, the output voltage Va of the error amplifier 13a is clamped to a maximum voltage which sets a pulse width to zero.

Further, the output signal of the voltage detecting circuit 14 becomes high when the output voltage Va of the error amplifier 13a exceeds the detection voltage $V_{DET}$ of the voltage detecting circuit 14, whereby the FET is rendered conductive.

In the case where the output voltage of the redundant switching power circuit 18 of another system at a time of $t_3$ is higher than the set value $V_0$, the output signal of the error amplifier 13b requires the pulse width of zero, and when the output voltage $V_1$ is lowered until the output voltage $V_1$ is equal to the set value $V_0$, the control operation of the error amplifier 13a is started and the internal voltage of the switching power circuit is controlled to the set value $V_0$.

In the case where some trouble within the switching power circuit, for example, the short-circuiting destruction of the rectifying diode 4 occurs at a time of $t_5$, thereby rapidly lowering the output voltage $V_1$, the output signal Va of the error amplifier 13a is lowered to a minimum voltage when the output voltage $V_1$ becomes lower than the set value $V_0$ by several millivolts (mV). As a result, the output signal Va of the error amplifier 13a becomes lower than the detection voltage $V_{DET}$ of the voltage detecting circuit 14. For that reason, the output voltage $V_G$ of the voltage detecting circuit 14 becomes low immediately, and the FET 11 is turned off so as to be rapidly cut off from the load side. Therefore, the rectifying diode 4 is short-circuited whereby current is prevented from being absorbed from the redundant switching power circuit 18 of another system, and the power voltage of the load 17 is prevented from lowering.

The above embodiment of the invention has been described using a forward switching power circuit of one transistor. However, the redundant structure of the invention can be realized with the same circuit structure even using a fly-back power circuit, a dropper power circuit or the like.

As was described above, according to the present invention, since the output voltage of the internal error amplifier in the switching power circuit with the redundant structure is detected so as to control the gate of the back-current obstructing FET, there are advantages in that an extreme high sensitivity and a high response speed can be obtained, an output voltage fluctuation problem when the internal element in the switching power circuit with the redundant structure using the conventional FET is destroyed can be solved, and the switching power circuit can be constituted by an extremely small number of components.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A switching power circuit with a redundant structure, comprising:
    a back-current obstructing element provided at an output side of said switching power circuit;
    a primary error amplifier connected to an output side of said back-current obstructing element to control a voltage at an output side of said back-current obstructing element;
    a secondary error amplifier connected to an internal side of said back-current obstructing element to control a voltage at an internal side of said back-current obstructing element;
    a field effect transistor being used as said back-current obstructing element so that a source electrode and a drain electrode are connected in a forward direction with respect to an output current; and
    a voltage detecting circuit for detecting an output voltage of said secondary error amplifier to produce an output signal for controlling a gate voltage of said field effect transistor.

2. A switching power circuit with a redundant structure as claimed in claim 1, further comprising a mixture circuit for mixing the output signal of said primary error amplifier with the output signal of said secondary error amplifier; and a voltage control circuit having a pulse width modulation control circuit which inputs the output signal of said mixture circuit and outputs a signal on the basis of which a switching transistor is controlled.

* * * * *